(12) United States Patent
Sun et al.

(10) Patent No.: US 12,124,963 B2
(45) Date of Patent: Oct. 22, 2024

(54) DISENTANGLED PERSONALIZED FEDERATED LEARNING METHOD VIA CONSENSUS REPRESENTATION EXTRACTION AND DIVERSITY PROPAGATION

(71) Applicant: INSTITUTE OF AUTOMATION, CHINESE ACADEMY OF SCIENCES, Beijing (CN)

(72) Inventors: Zhenan Sun, Beijing (CN); Yunlong Wang, Beijing (CN); Zhengquan Luo, Beijing (CN); Kunbo Zhang, Beijing (CN); Qi Li, Beijing (CN); Yong He, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 18/731,260

(22) Filed: Jun. 1, 2024

(65) Prior Publication Data
US 2024/0320513 A1    Sep. 26, 2024

Related U.S. Application Data

(63) Continuation of application No. PCT/CN2022/135821, filed on Dec. 1, 2022.

(30) Foreign Application Priority Data

Dec. 2, 2021  (CN) .......................... 202111456896.0

(51) Int. Cl.
    *G06N 3/098*    (2023.01)
(52) U.S. Cl.
    CPC .................................. *G06N 3/098* (2023.01)

(58) Field of Classification Search
    CPC ....................................................... G06N 3/098
    See application file for complete search history.

(56) References Cited

U.S. PATENT DOCUMENTS

| 2015/0242760 | A1  | 8/2015  | Miao et al. | |
| 2022/0417108 | A1* | 12/2022 | Mayyuri | ............. G06F 18/2148 |
| 2023/0106985 | A1* | 4/2023  | Hu | ......................... G06N 3/045 |
| | | | | 706/25 |

FOREIGN PATENT DOCUMENTS

| CN | 110807122 A | 2/2020 |
| CN | 113222031 A | 8/2021 |

(Continued)

OTHER PUBLICATIONS

Deng, Yuyang, Mohammad Mahdi Kamani, and Mehrdad Mahdavi. "Adaptive personalized federated learning." arXiv preprint arXiv: 2003.13461 (2020). (Year: 2020).*

(Continued)

*Primary Examiner* — Michael J Huntley
*Assistant Examiner* — Nicholas S Wu
(74) *Attorney, Agent, or Firm* — Westbridge IP LLC (57) ABSTRACT

Disclosed is a disentangled personalized federated learning method via consensus representation extraction and diversity propagation provided by embodiments of the present application. The method includes: receiving, by a current node, local consensus representation extraction models and unique representation extraction models corresponding to other nodes, respectively; extracting, by the current node, the representations of the data of the current node by using the unique representation extraction models of other nodes respectively, and calculating first mutual information between different sets of representation distributions, determining similarity of the data distributions between the nodes based on the size of the first mutual information, and determining aggregation weights corresponding to the other (Continued)

nodes based on the first mutual information; the current node obtains the global consensus representation aggregation model corresponding to the current node.

9 Claims, 6 Drawing Sheets

(56) References Cited

FOREIGN PATENT DOCUMENTS

| CN | 113240128 | A | 8/2021 |
|----|-----------|---|--------|
| CN | 113435604 | A | 9/2021 |
| CN | 113516255 | A | 10/2021 |
| CN | 113627332 | A | 11/2021 |
| CN | 113869528 | A | 12/2021 |
| WO | 2021169577 | A1 | 9/2021 |
| WO | 2021179196 | A1 | 9/2021 |

OTHER PUBLICATIONS

Belghazi et al., Mutual Information Neural Estimation, Proceedings of the 35th International Conference on Machine Learning, Stockholm, Sweden, PMLR 80, 2011, 22(4), pp. 1-18, dated Dec. 31, 2018.

First Office Action issued in counterpart Chinese Patent Application No. 202111456896.0, dated Jan. 12, 2022.

International Search Report and Written Opinion issued in corresponding PCT Application No. PCT/CN2022/135821, dated Feb. 16, 2023.

Notification to Grant Patent Right for Invention issued in counterpart Chinese Patent Application No. 202111456896.0, dated Feb. 17, 2022.

Peng et al., Federated Adversarial Domain Adaptation, ICLR 2020, pp. 1-19, dated Dec. 21, 2019.

Second Office Action issued in counterpart Chinese Patent Application No. 202111456896.0, dated Feb. 9, 2022.

* cited by examiner

DISENTANGLED PERSONALIZED FEDERATED LEARNING METHOD VIA CONSENSUS REPRESENTATION EXTRACTION AND DIVERSITY PROPAGATION

CROSS-REFERENCE TO RELATED APPLICATIONS

This application is a continuation of International Application No. PCT/CN2022/135821, filed on Dec. 1, 2022, which claims priority to Chinese Patent Application 202111456896.0, filed on Dec. 2, 2021. All of the aforementioned applications are incorporated herein by reference in their entireties.

TECHNICAL FIELD

The application relates to the technical field of computer and in particular relates to a disentangled personalized federated learning method via consensus representation extraction and diversity propagation.

BACKGROUND

Federated learning is a new distributed machine learning approach. In federated learning, the aggregation nodes use the Federated Averaging (FedAvg) algorithm to aggregate model updates from each node. After training, each node participating in federation training gets a unified global model, but the global model trained in this way is difficult to adapt to each node. Therefore, personalized federated learning is proposed.

At present, personalized federated learning usually includes weight aggregation methods, meta-learning schemes, domain adaptation schemes, personalized prediction layers, etc., but these schemes pay more attention to the non-independent and identical distribution of data label distribution differences, and do not fully care about each node. There are huge differences in data attributes between nodes due to differences in location environment and acquisition equipment, which will lead to poor generalization performance and poor interpretability of the trained model.

SUMMARY

The application provides a disentangled personalized federated learning method via consensus representation extraction and diversity propagation, to solve the technical problem of poor generalization performance and poor interpretability of the trained model caused by huge differences in attributes between nodes.

In a first aspect, the present application provides a disentangled personalized federated learning method via consensus representation extraction and diversity propagation, where the method is applied to a personalized federated learning system, the personalized federated learning system includes a plurality of nodes, the method including: step S1, receiving, by a current node, local consensus representation extraction models and unique representation extraction models corresponding to other nodes, respectively; step S2, extracting, by the current node, the representations of the data of the current node by using the unique representation extraction models of other nodes respectively, and calculating first mutual information between different sets of representation distributions, determining similarity of the data distributions between the nodes based on the size of the first mutual information, and determining aggregation weights corresponding to the other nodes based on the first mutual information; step S3, obtaining, by the current node, the global consensus representation aggregation model corresponding to the current node based on aggregation weights corresponding to the other nodes and local consensus representation extraction models corresponding to the other nodes.

As an optional embodiment, the aggregation weights Wji in step S2 is obtained through equation:

$$W_{ji} = \frac{I(E_s^j(x_i), E_s^i(x_i))}{\sum_{k=1}^{K} I(E_s^k(x_i), E_s^i(x_i))}$$

where, $E_s^j(x_i)$ denotes a representation of the current node i extracted by the unique representation extraction model corresponding to any node j among the other nodes; $E_s^i(x_i)$ denotes a representation of the current node i extracted by the unique representation extraction model of the current node i; and I denotes calculation of mutual information, and K denotes the number of nodes in the personalized federated learning system;

the global consensus representation aggregation model $E_c^{G_i}$ in the step S3 is obtained by the following equation:

$$E_c^{G_i} = \sum_{j=1}^{K} W_{ji} E_c^j$$

where, $E_c^j$ denotes the local consensus representation extraction model corresponding to any node j among the other nodes.

As an optional embodiment, prior to step S1, the method further includes: step S0, selecting at least two nodes randomly from the plurality of nodes, where the at least two nodes are used to perform the step S1-step S3.

As an optional embodiment, the method further includes: judging whether the times of iteratively executing the step S0-step S3 reaches a preset number of aggregation rounds; if not, returning to continue executing the step S0.

As an optional embodiment, the method further includes, prior to the step S0: step S4, updating the local consensus representation extraction model and the unique representation extraction model corresponding to each node according to a first preset optimization condition corresponding to each node; where the first preset optimization condition includes maximizing the value of second mutual information, maximizing the value of the similarity between the local consensus representation extraction model corresponding to each node and the global consensus representation aggregation model obtained from the previous aggregation round, and minimizing the value of third mutual information between the unique representation and the consensus representation of the node's raw data separated in an adversarial manner, where the second mutual information is the sum of the mutual information between the raw data of the nodes and the local consensus representation extraction model corresponding to the nodes and the mutual information between the raw data of the nodes and the global consensus representation aggregation model obtained in the previous aggregation round; step S5: updating a node model of each node according to a second preset optimization condition corresponding to each node, where the node model of each node includes a local consensus representation extraction model, a unique representation extraction model and a private prediction model of the node corresponding to each node, and the second preset optimization condition is a loss function value minimized with respect to the local consensus representation extraction model, the unique representation extraction model, and the node private prediction model of the node, where the second preset optimization condition is to minimize the value of the loss function related to the local consensus representation extraction model, the unique representation extraction model and the node private prediction model corresponding to the node.

As an optional embodiment, the method further includes judging whether the number of times of iteratively executing the step S4, the step S5 reaches a preset number of updates; if so, executing the step S1; if not, returning to continue executing the step S4.

As an optional embodiment, the first preset optimization condition L is shown in the following equation:

$$L = \hat{L}_{MI}^i + \lambda_{sim}\hat{L}_{sim}^i + \lambda_{client}L_{client}$$

where, $\lambda_{sim}$ denotes similarity weight, $\lambda_{client}$ denotes a third mutual information weight;

$\hat{L}_{MI}^i = I_{JSD}(X, E_c^i(X)) + I_{JSD}(X, E_c^G(X))$ denotes the second mutual information;

$$\hat{L}_{sim}^i = \frac{1}{n_i}\sum_{j=1}^{n_i}\cos(E_c^i(x_i^j), E_c^G(x_i^j))$$

denotes the similarity obtained by a cosine equation;

$L_{client} = E_{P(E_s^i)P(E_c^i)}[\log D(E_s^i, E_c^i)] + E_{P(E_s^i)P(E_c^i)}[\log(1-D(E_s^i, E_c^i))]$ denotes the third mutual information.

In a second aspect, the present application provides a disentangled personalized federated learning system via consensus representation extraction and diversity propagation, wherein, the personalized federated learning system includes a plurality of nodes; where, a current node is configured for receiving local consensus representation extraction models and unique representation extraction models corresponding to other nodes, respectively; the current node is configured for extracting the representations of the data of the current node by using the unique representation extraction models of other nodes respectively, and calculating first mutual information between different sets of representation distributions, determining similarity of the data distributions between the nodes based on the size of the first mutual information, and determining aggregation weights corresponding to the other nodes based on the first mutual information; the current node is configured for obtaining the global consensus representation aggregation model corresponding to the current node based on aggregation weights corresponding to the other nodes and local consensus representation extraction models corresponding to the other nodes.

In a third aspect, the present application provides an electronic device, including a processor, a communication interface, a memory and a communication bus, wherein the processor, the communication interface and the memory communicate with each other through the communication bus; where, the memory is configured for storing computer programs; the processor is configured for, when executing the computer programs stored in the memory, implementing steps of the disentangled personalized federated learning method via consensus representation extraction and diversity propagation according to the first aspect.

In a fourth aspect, the present application provides a non-transitory computer-readable storage medium having computer programs stored thereon, wherein the computer programs, when being executed by a processor, implement steps of the disentangled personalized federated learning method via consensus representation extraction and diversity propagation according to the first aspect.

The disentangled personalized federated learning method via consensus representation extraction and diversity propagation provided by embodiments of the present application is applied to a personalized federated learning system, the personalized federated learning system includes a plurality of nodes. The method includes: receiving, by a current node, local consensus representation extraction models and unique representation extraction models corresponding to other nodes, respectively; extracting, by the current node, the representations of the data of the current node by using the unique representation extraction models of other nodes respectively, and calculating first mutual information between different sets of representation distributions, determining similarity of the data distributions between the nodes based on the size of the first mutual information, and determining aggregation weights corresponding to the other nodes based on the first mutual information; obtaining, by the current node, the global consensus representation aggregation model corresponding to the current node based on aggregation weights corresponding to the other nodes and local consensus representation extraction models corresponding to the other nodes; i.e., the embodiments of the present application, the global consensus representation aggregation model obtained by aggregating the local consensus representation models of the nodes has good generalization capability, and the personalized aggregation scheme based on the similarity weight of unique representations weakens the negative performance migration caused by the huge difference in node attributes.

BRIEF DESCRIPTION OF THE DRAWINGS

The drawings herein incorporated in and forming part of the specification illustrate embodiments in accordance with the application and are used together with the specification to explain the principles of the application.

In order to explain more clearly the embodiments of the present application or the technical proposal in the prior art, the following will briefly describe the accompanying drawings that need to be used in the description of the embodiments or the prior art. It is obvious that for those of ordinary skill in the art, other accompanying drawings can be obtained from these accompanying drawings without exerting creative labor.

DETAILED DESCRIPTION OF THE EMBODIMENTS

In order to make the purposes, technical proposals and advantages of the embodiments of the present application more clear, the technical proposals of the embodiments of the present application will be clearly and completely described in conjunction with the accompanying drawings of the embodiments of the present application. Obviously, the described embodiments are part of the embodiments of the present application, but not all of the embodiments. Based on the embodiments of the present application, all other embodiments obtained without creative effort by those of ordinary skill in the art fall within the scope of protection of the present application.

The terms involved in the present application are explained below.

Node: the demand side of the tasks involved in federated learning, typically with some private data. Examples include cell phone users who need a certain feature provided by the app.

Consensus knowledge, also known as consensus attributes and consensus representations, is the knowledge or inherent attributes and essences that are common to all participating nodes for a particular task, with a high degree of domain generalization capability.

Unique attributes, also known as unique representations, are the unique attributes, or peripheral properties, of any participating node that are useful for improving task performance in addition to consensus knowledge, and are diverse across nodes.

Diversity transfer unique attributes are diverse across nodes, by passing multiple unique attribute extraction networks between nodes, forcing the target node to focus on peripheral attributes that other nodes' data is concerned with, as well as potentially estimating the similarity of attribute distributions between data domains through differences in representational information.

In recent years, federated learning has made breakthroughs in joint training under the protection of data privacy, and has been widely used in many aspects. However, due to the different geographical and spatial distributions of the nodes, the different complexities of the environments and scenarios they face, and the wide variety of data collection devices at the nodes, resulting in huge attribute differences in the node data, leading to poor generalization ability of the federated learning network along with low task performance, which poses a considerable obstacle to the development and application of federated learning. Especially in the field of biometrics, the differences in feature attributes caused by different races, genders, and ages, as well as the huge environmental differences and shooting parameter differences between the devices used to acquire the images, hinder the further improvement of the recognition accuracy, and at the same time, make it impossible for the network to better generalize to unseen biological data and achieve accurate recognition results, which is due to the excessive number of unique attributes introduced during the training of the network. For example, FedAvg, the classic federated learning framework, directly uses the mean values of model parameters of multiple nodes as the global aggregation model during aggregation, which directly mixes the domain-specific attributes of different domains, leading to poor generalization.

In order to overcome the problem of propagation of unique attributes to the global network diminishing generalizability, existing research proposals for personalized federated learning can be classified into several implementations.

1) Weighted aggregation methods: by finding the data node that is most related to the corresponding node or has the greatest performance improvement among a large number of nodes, the corresponding model weighting aggregation is carried out. At present, it is common that the node that has a greater impact on the performance improvement of the target model occupies a greater weight, or with higher model similarity occupies a greater weight.

2) The meta-learning scheme, by setting on different meta-model initialization parameters for different tasks at each node, can be quickly reapplied to new nodes and adapted to the corresponding data distribution.

3) Domain adaptation approach: by taking other data nodes as source domains, the consensus knowledge of different domains will be extracted and transferred to the target domain by knowledge distillation to improve the task performance of the target domain.

4) Personalized Prediction Layer: globally aggregates and updates feature extractors, preserves predictors private to each node, and enhances network personalization to handle different data.

However, in the above implementation methods, more attention is paid to the non-i.i.d problem of the distribution difference of data labels in federated learning, and there is no sufficient concern for the attribute difference of each data node to obtain the data. Degradation of task performance. And most methods let the node model independently learn the attribute features that have an effect on the task, ignoring the interpretability of the extracted features of the model.

Aiming at the above technical problems, the technical conception of the present application is that: a consensus knowledge network with better domain generalization ability is constructed by extracting task-oriented consensus representation, and at the same time, diverse unique attributes are propagated among each node to provide a personalized aggregation scheme, so as to reduce the negative performance migration that may be caused by nodes with huge attribute differences.

Figure 1:
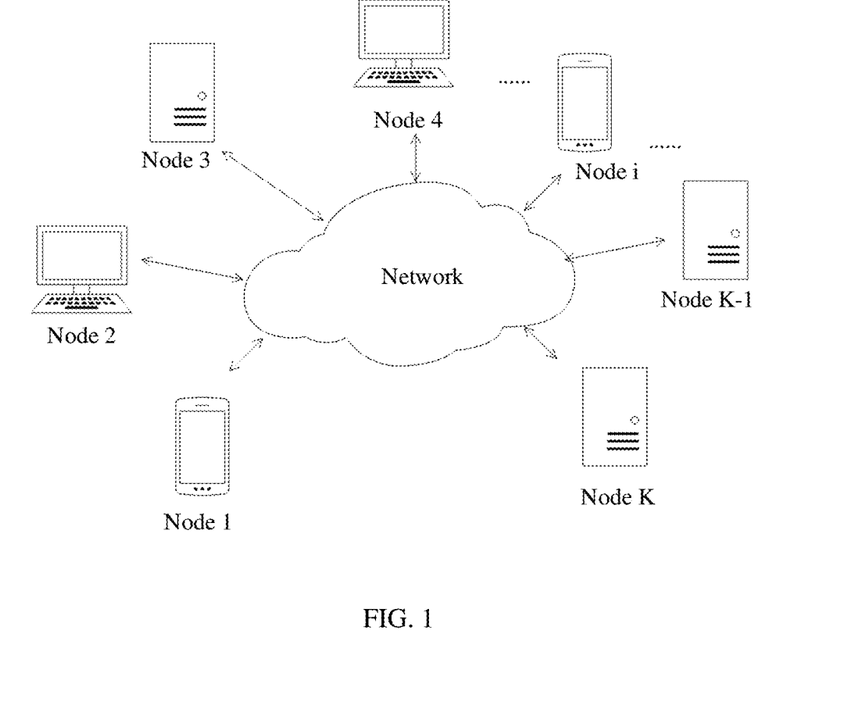
FIG. 1 is a diagram of a system architecture provided by an embodiment of the present application.

FIG. 1 shows a system architecture diagram provided by an embodiment of the present application. As shown in FIG. 1, the system defines a plurality of nodes, and if the nodes total $|C|=K$, each of these K nodes can be represented as $c:=\{c_i\}_{i=1}^{K}$, correspondingly the ith node contains ni training data $N:=\{n_i\}_{i=1}^{K}$, where $|c_i|$ denotes the number of categories, whose data are expressed as $D_i=\{(x_i^j, y_i^j), x_i^j \in \mathfrak{R}^d, y_i^j \in \mathfrak{R}\}_{j=1}^{n_i}$, Di denotes the training data owned by node i. It is noted that each node may be a terminal device such as a cell phone, a computer, a server, and each node in the system may be used to perform the following embodiments.

Figure 2:
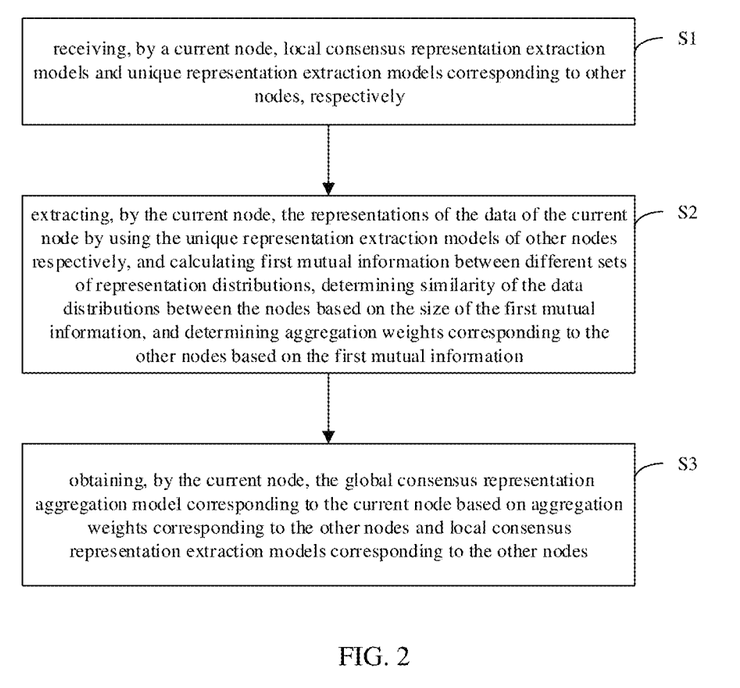
FIG. 2 shows a flow diagram of a disentangled personalized federated learning method via consensus representation extraction and diversity propagation provided by an embodiment of the present application.

FIG. 2 shows a flow diagram of a disentangled personalized federated learning method via consensus representation extraction and diversity propagation provided by an embodiment of the present application. As shown in FIG. 2, the disentangled personalized federated learning method via consensus representation extraction and diversity propagation includes:

step S1, a current node receives local consensus representation extraction models and unique representation extraction models corresponding to other nodes, respectively.

Specifically, each node in the system shown in FIG. 1 adequately separates the consensus representations and unique representations that the node's raw data has by means of representation disentanglement method, i.e., each node has been trained with a local consensus representation extraction model and a unique representation extraction model. In this step, each node in the system can receive the local consensus representation extraction model and the unique representation extraction model transmitted from other nodes, in other words, it is to transmit the respective local consensus representation extraction model and the unique representation extraction model among different nodes to each other, i.e., to carry out diversity propagation. In this application, the node that receives the local consensus representation extraction model and the unique representation extraction model transmitted from other nodes is referred to as the current node.

step S2, extracting, by the current node, the representations of the data of the current node by using the unique representation extraction models of other nodes respectively, and calculating first mutual information between different sets of representation distributions, determining similarity of the data distributions between the nodes based on the size of the first mutual information, and determining respective corresponding aggregation weights of the other nodes based on the first mutual information;

Specifically, after propagating these unique attribute extraction models among nodes through step S1, if the data of a node is extracted by different unique attribute extraction models with high similarity, it indicates that the nodes from which these unique attribute extraction models are derived have strong attribute correlation, and increasing the weights of these nodes in the global aggregation will contribute to better knowledge propagation, which can effectively avoid negative performance migration that may be caused by some of the nodes with too large data distribution difference.

As an optional embodiment, the aggregation weights Wji in step S2 is obtained through equation (1):

$$W_{ji} = \frac{I(E_s^j(x_i), E_s^i(x_i))}{\sum_{k=1}^{K} I(E_s^k(x_i), E_s^i(x_i))} \quad (1)$$

where, $E_s^j(x)$ denotes a representation of the current node i extracted by the unique representation extraction model corresponding to any node j among the other nodes; $E_s^i(x_i)$ denotes a representation of the current node i extracted by the unique representation extraction model of the current node i; and I denotes calculation of mutual information.

step S3, the current node obtains a global consensus representation aggregation model corresponding to the current node based on the aggregation weight corresponding to each of the cooperating nodes, and a second local consensus representation extraction model corresponding to each of the cooperating nodes.

As an optional embodiment, the global consensus representation aggregation model $E_c^{G_i}$ in step S3 is obtained by equation (2):

$$E_c^{G_i} = \sum_{j=1}^{K} W_{ji} E_c^j = \sum_{j=1}^{K} \frac{I(E_s^j(x_i), E_s^i(x_i))}{\sum_{k=1}^{K} I(E_s^k(x_i), E_s^i(x_i))} E_c^j \quad (2)$$

where, $E_c^j$ denotes the local consensus representation extraction model corresponding to any node j among the other nodes.

It should be noted that each node in the system may be a current node, and the current node performs step S1-step S3, such that each node obtains a global consensus representation aggregation model corresponding to the node, i.e., a global aggregation model personalized for each node is calculated.

The disentangled personalized federated learning method via consensus representation extraction and diversity propagation provided by embodiments of the present application includes receiving, by a current node, local consensus representation extraction models and unique representation extraction models corresponding to other nodes, respectively; extracting, by the current node, the representations of the data of the current node by using the unique representation extraction models of other nodes respectively, and calculating first mutual information between different sets of representation distributions, determining similarity of the data distributions between the nodes based on the size of the first mutual information, and determining aggregation weights corresponding to the other nodes based on the first mutual information; obtaining, by the current node, the global consensus representation aggregation model corresponding to the current node based on aggregation weights corresponding to the other nodes and local consensus representation extraction models corresponding to the other nodes; i.e., the embodiments of the present application, the global consensus representation aggregation model obtained by aggregating the local consensus representation models of the nodes has good generalization capability, and the personalized aggregation scheme based on the similarity weight of unique representations weakens the negative performance migration caused by the huge difference in node attributes.

Figure 3:
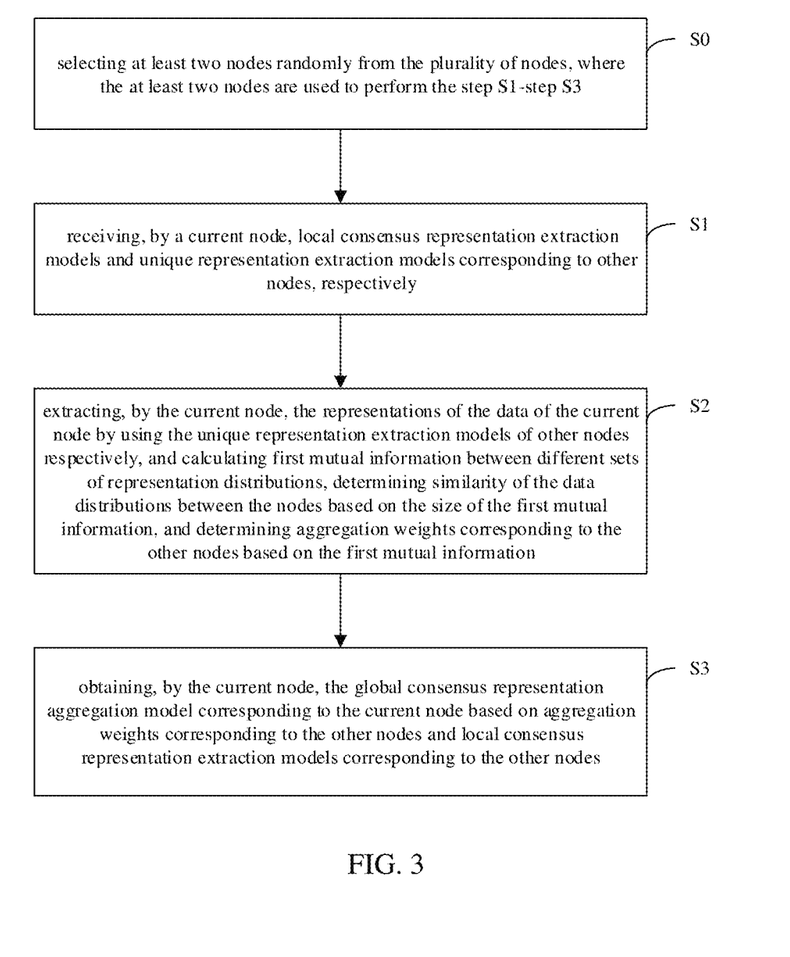
FIG. 3 shows a flow diagram of another disentangled personalized federated learning method via consensus representation extraction and diversity propagation provided by an embodiment of the present application.

On the basis of the above embodiments, FIG. 3 shows a flow diagram of another disentangled personalized federated learning method via consensus representation extraction and diversity propagation provided by an embodiment of the present application. As shown in FIG. 3, the disentangled personalized federated learning method via consensus representation extraction and diversity propagation includes:

step S0, at least two nodes are randomly selected from the plurality of nodes, the at least two nodes being used to perform the step S1-step S3.

Specifically, if the system has a total of K nodes, then M nodes can be randomly selected from the K nodes, and the M nodes are used to perform the following steps S1-S3, where M is less than or equal to K.

step S1, receiving, by a current node, local consensus representation extraction models and unique representation extraction models corresponding to other nodes, respectively;

step S2, extracting, by the current node, the representations of the data of the current node by using the unique representation extraction models of other nodes respectively, and calculating first mutual information between different sets of representation distributions, determining similarity of the data distributions between the nodes based on the size of the first mutual information, and determining aggregation weights corresponding to the other nodes based on the first mutual information;

step S3, obtaining, by the current node, the global consensus representation aggregation model corresponding to the current node based on aggregation weights corresponding to the other nodes and local consensus representation extraction models corresponding to the other nodes.

The difference with the above embodiment is that considering the bandwidth and latency constraints of the communication among the nodes. In this embodiment, M nodes will be randomly selected from K nodes to participate in the current round of personalized federated learning, so as to obtain the global consensus representation aggregation model corresponding to these M nodes in this round.

As an optional embodiment, the method further includes: judging whether the times of iteratively executing the step S0-step S3 reaches a preset number of aggregation rounds; if not, returning to continue executing the step S0.

Specifically, a preset aggregation round T is set, and the current update round is t. steps S0-steps S4 are executed when t<=T is satisfied, and t=t+1 at the end of the round; otherwise, the training is ended. That is, the embodiment of the present application selects some of the nodes for aggregation optimization in each aggregation round, and performs multiple rounds of aggregation, so as to achieve obtaining a global consensus representation aggregation model corresponding to each node.

The disentangled personalized federated learning method via consensus representation extraction and diversity propagation provided by the embodiment of the present application, by randomly selecting at least two nodes from the plurality of nodes in each of the aggregation rounds, where the at least two nodes being used to perform the step S1-step S3, avoids the problem of straining the communication bandwidth resources and delays due to the fact that all the nodes are communicating with each other at the same time; and also obtains a global consensus representation aggregation model corresponding to each node through a plurality of aggregation rounds.

Figure 4:
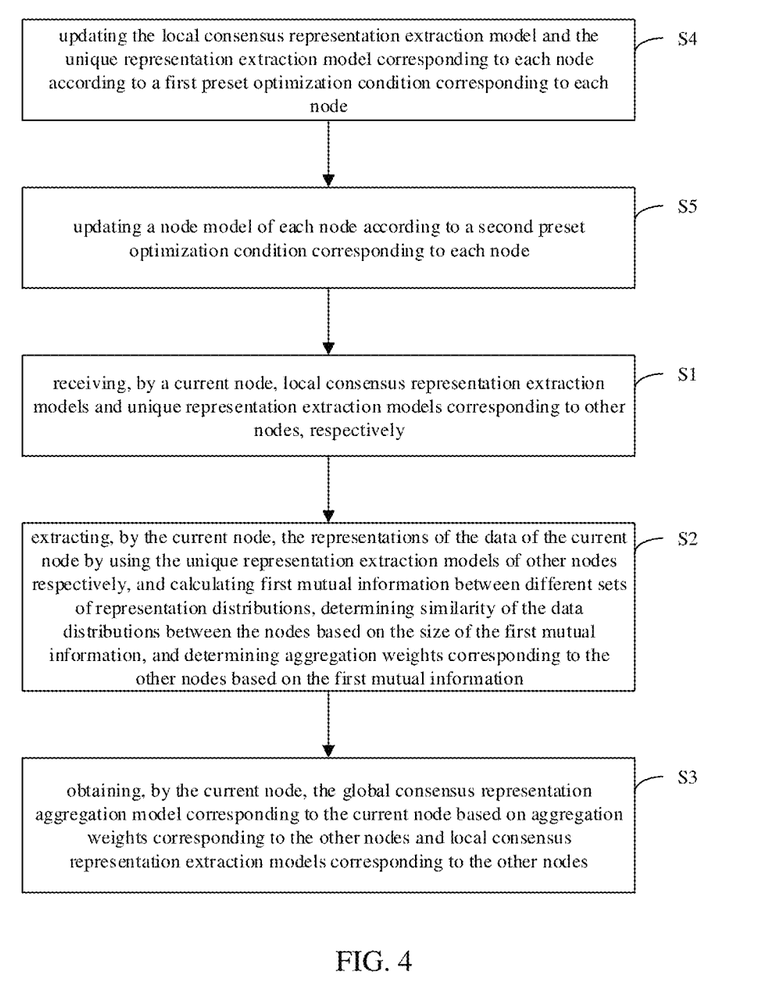
FIG. 4 shows a flow diagram of yet another disentangled personalized federated learning method via consensus representation extraction and diversity propagation provided by an embodiment of the present application.

Based on the above embodiments, FIG. 4 shows a flow diagram of yet another disentangled personalized federated learning method via consensus representation extraction and diversity propagation provided by an embodiment of the present application. As shown in FIG. 4, the disentangled personalized federated learning method via consensus representation extraction and diversity propagation includes:

step S4, updating the local consensus representation extraction model and the unique representation extraction model corresponding to each node according to a first preset optimization condition corresponding to each node;

where the first preset optimization condition includes maximizing the value of second mutual information, maximizing the value of the similarity between the local consensus representation extraction model corresponding to each node and the global consensus representation aggregation model obtained from the previous aggregation round, and minimizing the value of third mutual information between the unique representation and the consensus representation of the node's raw data separated in an adversarial manner, where the second mutual information is the sum of the mutual information between the raw data of the nodes and the local consensus representation extraction model corresponding to the nodes and the mutual information between the raw data of the nodes and the global consensus representation aggregation model obtained in the previous aggregation round;

step S5, updating a node model of each node according to a second preset optimization condition corresponding to each node;

where the node model of each node includes a local consensus representation extraction model, a unique representation extraction model and a private prediction model of the node corresponding to each node, and the second preset optimization condition is a loss function value minimized with respect to the local consensus representation extraction model, the unique representation extraction model, and the node private prediction model of the node, where the second preset optimization condition is to minimize the value of the loss function related to the local consensus representation extraction model, the unique representation extraction model and the node private prediction model corresponding to the node.

step S1, receiving, by a current node, local consensus representation extraction models and unique representation extraction models corresponding to other nodes, respectively;

step S2, extracting, by the current node, the representations of the data of the current node by using the unique representation extraction models of other nodes respectively, and calculating first mutual information between different sets of representation distributions, determining similarity of the data distributions between the nodes based on the size of the first mutual information, and determining aggregation weights corresponding to the other nodes based on the first mutual information;

step S3, obtaining, by the current node, the global consensus representation aggregation model corresponding to the current node based on aggregation weights corresponding to the other nodes and local consensus representation extraction models corresponding to the other nodes.

The difference with the above embodiments is that this embodiment further limits the process of updating the node model locally for each node. In this embodiment, updating the local consensus representation extraction model and the unique representation extraction model corresponding to each node according to a first preset optimization condition corresponding to each node; where the first preset optimization condition includes maximizing the value of second mutual information, maximizing the value of the similarity between the local consensus representation extraction model corresponding to each node and the global consensus representation aggregation model obtained from the previous aggregation round, and minimizing the value of third mutual information between the unique representation and the consensus representation of the node's raw data separated in an adversarial manner, where the second mutual information is the sum of the mutual information between the raw data of the nodes and the local consensus representation extraction model corresponding to the nodes and the mutual information between the raw data of the nodes and the global consensus representation aggregation model obtained in the previous aggregation round; updating a node model of each node according to a second preset optimization condition corresponding to each node, where the node model of each node includes a local consensus representation extraction model, a unique representation extraction model and a private prediction model of the node corresponding to each node, and the second preset optimization condition is a loss function value minimized with respect to the local consensus representation extraction model, the unique representation extraction model, and the node private prediction model of the node, where the second preset optimization condition is to minimize the value of the loss function related to the local consensus representation extraction model, the unique representation extraction model and the node private prediction model corresponding to the node.

Specifically, the node i model is defined as f: X→Y, which can be categorized into a local consensus representation extraction model $E_c^i$, a unique representation extraction model $E_s^i$ of the node, and a node private prediction model $P^i$, whose corresponding model parameters are $\theta_c^i$, $\theta_s^i$, $\theta_p^i$, respectively, the second preset optimization condition in the defined step S5 is as shown in equation (3):

$$L_i = \underset{\{\theta_c^i, \theta_s^i, \theta_p^i\}}{\text{argmin}} E_{(x_i, y_i) \sim D_i^*} [1_i(x_i, y_i, E_c^i, E_s^i, P^i)] \quad (3)$$

where $1_i$ denotes the loss function calculation; argmin denotes the minimum value that can be obtained when changing the node model parameters. Since the distribution of the real data is unknowable, empirical optimization conditions are used for feasible mathematical calculation. Preferably, the second preset optimization condition is shown in equation (4):

$$\hat{L}_i = \frac{1}{n_i} \sum_{j=1}^{n_i} 1_i \left( P^i \left( E_c^i(x_i^j) \oplus E_s^i(x_i^j) \right), y_i^j \right) \quad (4)$$

As an optional embodiment, the first preset optimization condition L in step S4 is shown in equation (5):

$$L = \hat{L}_{MI}^i + \lambda_{sim} \hat{L}_{sim}^i + \lambda_{client} L_{client} \quad (5)$$

where, $\lambda_{sim}$ denotes the similarity weight, $\lambda_{client}$ denotes a third mutual information weight;

$\hat{L}_{MI}^i = I_{JSD}(X, E_c^i(X)) + I_{JSD}(X, E_c^G(X))$ denotes the second mutual information;

$$\hat{L}_{sim}^i = \frac{1}{n_i} \sum_{j=1}^{n_i} \cos \left( E_c^i(x_i^j), E_c^G(x_i^j) \right)$$

denotes the similarity obtained by a cosine equation;

$L_{client} = E_{P(E_s^i)P(E_c^i)}[\log D(E_s^i, E_c^i)] + E_{P(E_s^i)P(E_c^i)}[\log(1-D(E_s^i, E_c^i))]$ denotes the third mutual information.

Specifically, in order to ensure that as many valid consensus representations as possible are extracted, it is necessary to maximize the second mutual information. The second mutual information is the mutual information between the node's raw data X and the representations extracted by the local consensus representation extraction model corresponding to the node, plus the mutual information between the node's raw data X and the representations extracted by the global consensus representation aggregation model (obtained in the previous aggregation round), as shown in equation (6):

$$\hat{L}_{MI}^i = I(X, E_c^i(X)) + I(X, E_c^G(X)) \quad (6)$$

where I denotes the equation to calculate the mutual information.

$$I(x, z) = \int_X \int_Z p(x, z) \log \left( \frac{p(x, z)}{p(x)p(z)} \right) dzdz = D_{KL}(P_{XZ} \| P_X P_Z)$$

denotes the mutual information of two vectors x,z with information, using the Jensen-Shannon mutual information estimator with the objective of minimizing the following equation:

$$I_{JSD} = E_{p(x,y)}[\rho(-f(x,z))] - E_{p(x)p(z)}[-\rho(f(x,z))] \quad (7)$$

where $\rho(x) = \log(1+e^x)$ denotes the activation function and f is the discriminator function.

Then the second mutual information changes to equation (8) as follows:

$$\hat{L}_{MI}^i = I_{JSD}(X, E_c^i(X)) + I_{JSD}(X, E_c^G(X)) \quad (8)$$

Further, in order to extract the node consensus representations, if the representations can be separated sufficiently and in line with expectations, it means that the representations extracted by the local consensus representation extraction model and the representations extracted by the global consensus representation aggregation model need to be sufficiently similar, and thus the consensus similarity constraint is introduced as shown in equation (9):

$$L_{sim}^i = E_{p(x)} D(E_c^i(X), E_c^G(X)) \quad (9)$$

where D( ) denotes the equation to calculate similarity. Preferably, a cosine similarity measure is used to calculate the similarity, as shown in equation (10):

$$\hat{L}_{sim}^i = \frac{1}{n_i} \sum_{j=1}^{n_i} \cos \left( E_c^i(x_i^j), E_c^G(x_i^j) \right) \quad (10)$$

Further, in order to separate the unique representations and consensus representations that are present in the node's raw data as much as possible, this is done by minimizing the mutual information between the two representations, i.e., minimizing $D_{JS}(P_{E_s^i E_c^i} \| P_{E_s^i} P_{E_c^i})$, the separation of the two representations using an adversarial approach as shown in equation (11):

$$L_{client} = E_{P(E_s^i)P(E_c^i)}[\log D(E_s^i, E_c^i)] + E_{P(E_s^i)P(E_c^i)}[\log(1-D(E_s^i, E_c^i))] \quad (11)$$

In conclusion, the first preset optimization condition is shown in equation (5), which indicates that the weighted aggregation of the three calculated losses yields the final overall optimization objective (loss function).

As an optional embodiment, the method further includes: judging whether the number of times of iteratively executing the step S4, the step S5 reaches a preset number of updates; if so, executing the step S1; if not, returning to continue performing step S4.

Specifically, firstly, each node performs the local update of step S4 and step S5 with a preset number of updates E to obtain the updated node model, and then passes the local consensus representation extraction model and the unique representation extraction model in the updated node model among different nodes, i.e., performs step S1. That is, each node first completes E rounds of local update, and then proceeds to the training of the global consensus representation aggregation model for the next aggregation round.

Optionally, if the global consensus representation aggregation model for the previous aggregation round cannot be obtained, the node model of each node is initialized and step S1-step S3 are performed, and the obtained global consensus representation aggregation model is used as the global consensus representation aggregation model for the previous aggregation round.

Specifically, when each node is undergoing E rounds local update, it is possible that each node has not yet obtained the global consensus representation extraction model, then step S4 cannot be executed; then the node model of each node can be randomly initialized before step S4, and then the initial local representation extraction model and the initial unique representation extraction model corresponding to the initialized node model are passed among the nodes, and then the global consensus representation aggregation model corresponding to the current node is obtained, and to perform local E rounds update according to the global consensus representation aggregation model.

The disentangled personalized federated learning method via consensus representation extraction and diversity propagation provided by embodiments of the present application, by updating the local consensus representation extraction model and the unique representation extraction model corresponding to each node according to a first preset optimization condition corresponding to each node; where the first preset optimization condition includes maximizing the value of second mutual information, maximizing the value of the similarity between the local consensus representation extraction model corresponding to each node and the global consensus representation aggregation model obtained from the previous aggregation round, and minimizing the value of third mutual information between the unique representation and the consensus representation of the node's raw data separated in an adversarial manner, where the second mutual information is the sum of the mutual information between the raw data of the nodes and the local consensus representation extraction model corresponding to the nodes and the mutual information between the raw data of the nodes and the global consensus representation aggregation model obtained in the previous aggregation round; updating a node model of each node according to a second preset optimization condition corresponding to each node, where the node model of each node includes a local consensus representation extraction model, a unique representation extraction model and a private prediction model of the node corresponding to each node, and the second preset optimization condition is a loss function value minimized with respect to the local consensus representation extraction model, the unique representation extraction model, and the node private prediction model of the node, where the second preset optimization condition is to minimize the value of the loss function related to the local consensus representation extraction model, the unique representation extraction model and the node private prediction model corresponding to the node; i.e., the embodiments of the present application, by maximizing the sum of the mutual information between the raw data of the nodes and the local consensus representation extraction model corresponding to the nodes and the mutual information between the raw data of the nodes and the global consensus representation aggregation model obtained in the previous aggregation round, maximizing the value of the similarity between the local consensus representation extraction model corresponding to each node and the global consensus representation aggregation model obtained from the previous aggregation round, and minimizing the value of third mutual information between the unique representation and the consensus representation of the node's raw data separated in an adversarial manner, to achieve that the consensus representation and unique representation of nodes are fully separated, and the consensus representations of nodes are fully extracted and the consensus representations among nodes are effectively extracted, which improves the generalization capability of the global model.

Figure 5:
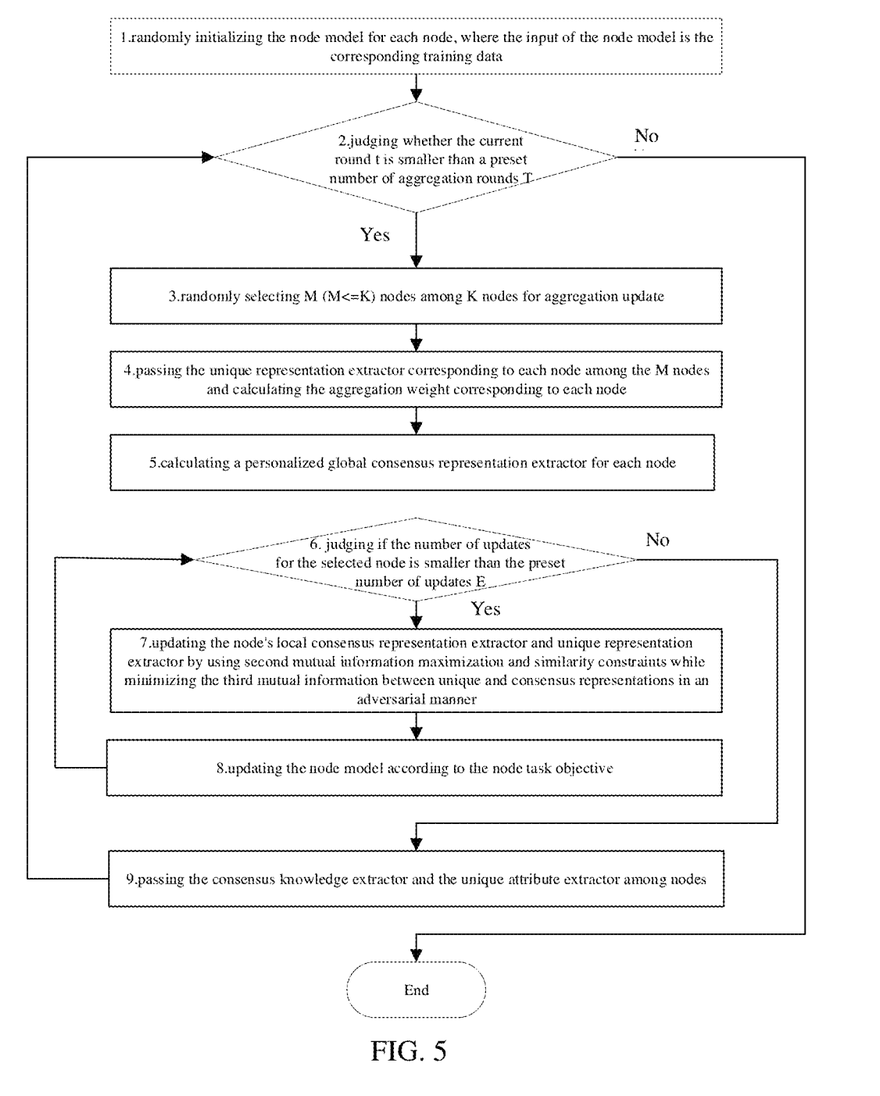
FIG. 5 shows a block diagram of a disentangled personalized federated learning method via consensus representation extraction and diversity propagation provided by an embodiment of the present application.
Figure 6:
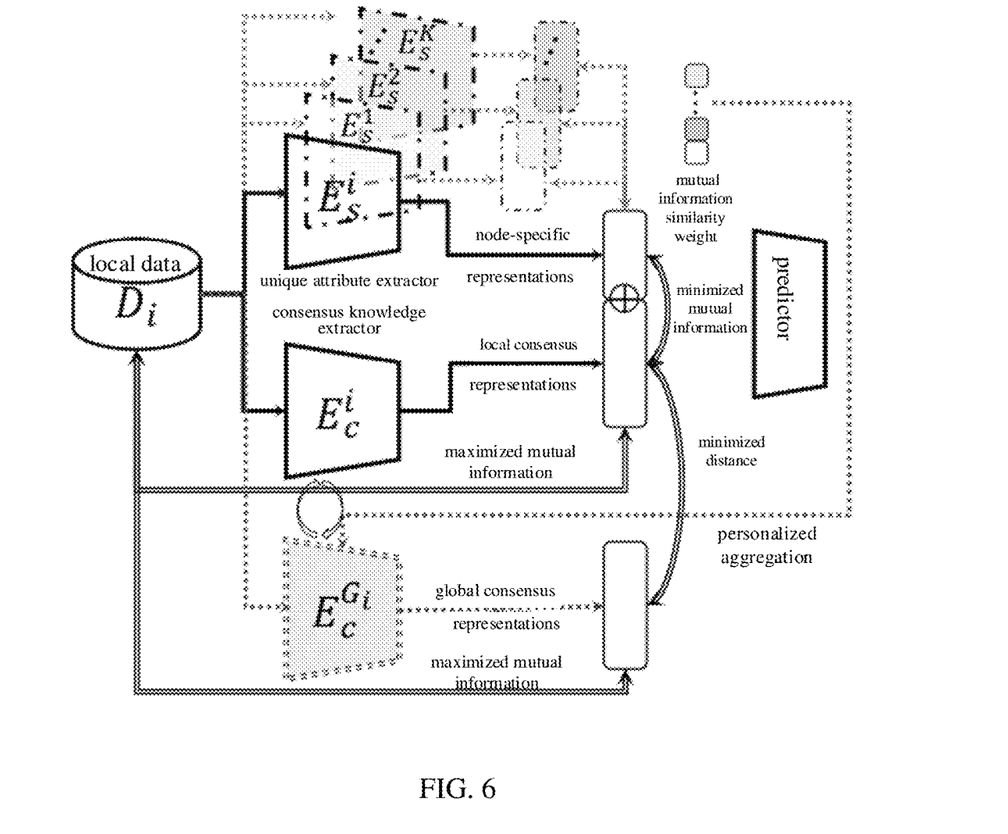
FIG. 6 shows a detailed flow diagram of a disentangled personalized federated learning method via consensus representation extraction and diversity propagation provided by an embodiment of the present application.

In order to further understand the embodiments of the present application, FIG. 5 shows a block diagram of a disentangled personalized federated learning method via consensus representation extraction and diversity propagation provided by an embodiment of the present application; FIG. 6 shows a detailed flow diagram of a disentangled personalized federated learning method via consensus representation extraction and diversity propagation provided by an embodiment of the present application, which, in combination with FIG. 5 and FIG. 6, the personalized federated learning includes the following steps:

step 1: randomly initializing the node model for each node, where the input of the node model is the corresponding training data Di.

As shown in FIG. 5, the node model for node i includes a local consensus representation extractor $E_c^i$, a unique representation extractor $E_s^i$, and a predictor that is private to each node, where the input of the node model is local data Di, where $E_c^i$ can extract the local consensus representations in Di, and $E_s^i$ can extract the corresponding unique representations.

In this step, the node models of all nodes are randomly initialized with the same weights, i.e., the unique representation extractors and the local consensus representation extractors of all nodes are randomly initialized with the same weights, as well as the corresponding predictors of each node are initialized.

step 2: judging whether the current round t is smaller than a preset number of aggregation rounds T.

If yes, perform step 3 downwards, if no, jump to step 10 to end the training.

Specifically, the preset number of aggregation rounds is T, and the current round is t. step 3 is executed downward when t<=T is satisfied, and t=t+1 after the steps of each round is executed; otherwise, jump to the last step to end the training.

step 3: randomly selecting M (M<=K) nodes among K nodes for aggregation update.

step 4: passing the unique representation extractor corresponding to each node among the M nodes and calculating the aggregation weight corresponding to each node (which can also be called mutual information similarity weight).

As shown in FIG. 5, the unique representation extractors of the selected M nodes are passed on to each other, and the mutual information between the representations extracted by the unique representation extractor of different nodes and the original data of the same node is calculated, and the concerns of different node models are measured based on the mutual information, then to infer whether the unique representations between the nodes are similar or not and assign higher aggregation weights to nodes with higher attribute similarities.

step 5: calculating a personalized global consensus representation extractor for each node.

Specifically, the aggregation scheme as in equation (2) is executed for each node to obtain the corresponding global consensus representation extractor $E_c^{G_i}$ for each node, which achieves personalized federated learning, as in FIG. 5, to obtain $E_c^{G_i}$ by personalized aggregation using mutual information similarity weights.

step 6: judging whether the number of updates for the selected node is smaller than the preset number of updates E.

If yes, step 7 is executed, if no, step 9 is executed, i.e., the corresponding local consensus representation extractor and unique representation extractor for each node are passed, and then return to step 2 to determine whether to proceed to the next aggregation round of aggregation optimization.

step 7: updating the node's local consensus representation extractor and unique representation extractor by using second mutual information maximization and similarity constraints while minimizing the third mutual information between unique and consensus representations in an adversarial manner.

Referring to FIG. 5, the second mutual information is a sum of the mutual information, the mutual information between the local data Di and the global consensus representations extracted by $E_c^{G_i}$ plus the mutual information between Di and the local consensus representations extracted by $E_c^i$. In order to obtain the maximized second mutual information, maximizing the mutual information between the local data Di and the global consensus representations extracted by $E_c^{G_i}$, and maximizing the mutual information between Di and the local consensus representations extracted by $E_c^i$; the similarity constraint is to maximize the value of the similarity between the local consensus representations extracted by $E_c^i$ and the global consensus representations extracted by $E_c^{G_i}$, and to minimize the mutual information between the unique representations and the local consensus representations. That is, the local equation representation extractor and the unique representation extractor of a node can be updated according to equation (6).

step 8: updating the node model according to the node task objective.

Specifically, the node model are updated, where the node task objective is as shown in equation (5).

step 9: passing the consensus knowledge extractor and the unique attribute extractor among nodes.

Specifically, each node's predictor is retained at the node as a node-specific personalization layer without aggregation and propagation.

step 10: End the training.

In conclusion, the embodiments of the present application disentangle the node's raw data representations into unique representations and consensus representations by maximizing the mutual information, and obtains the global model by aggregating the local consensus representations of all nodes, and has good generalization capability; and provides a unique representation similarity weight scheme for the aggregation of the global model through the propagation of the unique representation extraction models among nodes, and mitigates the problem of weak consensus representations of the aggregated model through a personalized aggregation scheme, eliminating the negative migration that may be caused by the huge data attribute differences, and at the same time spreading the diversity through the different focuses of each node's unique representation model. Each feature extraction model focuses on different attributes of the data, and by propagating these models to try to get individual data nodes to look for other node's unique representations, can potentially discover attribute similarities of the data, which can effectively supplement the performance of the global model, while facilitating model aggregation of nodes with similar attributes, and improving the personalization and performance of federated learning, as well as enhancing the interpretability and generalization performance of the framework.

Further, it is noted that embodiments of the present application can be applied to the field of biometric identification. In the field of biometrics, the data auired by different devices, environments, and people have a high degree of attribute heterogeneity, for example, the distribution of human races in the biological data collected in different continents has a large difference. When a traditional approach is used for distributed joint training based on the privacy and security of the raw data not being compromised, this attribute variability leads to a final global model that does not have good generalization capability and personalization capability. The embodiment of the present application effectively improves the accuracy of biometric identification of each node and improves the generalization capability of the consensus aggregation network through the disentangled personalized federated learning framework algorithm via consensus representation extraction and diversity propagation, which sufficiently separates the consensus representations and the unique representations of biological data in each node, and performs personalized weighted aggregation and training.

Embodiments of the present application also provide a disentangled personalized federated learning system via consensus representation extraction and diversity propagation, which may be shown with reference to FIG. 1, where the personalized federated learning system includes a plurality of nodes; where, a current node is configured for receiving local consensus representation extraction models and unique representation extraction models corresponding to other nodes, respectively; the current node is configured for extracting the representations of the data of the current node by using the unique representation extraction models of other nodes respectively, and calculating first mutual information between different sets of representation distributions, determining similarity of the data distributions between the nodes based on the size of the first mutual information, and determining aggregation weights corresponding to the other nodes based on the first mutual information; the current node is configured for obtaining the global consensus representation aggregation model corresponding to the current node based on aggregation weights corresponding to the other nodes and local consensus representation extraction models corresponding to the other nodes.

As an optional embodiment of the present application, the aggregation weight Wji is obtained by the following equation:

$$W_{ji} = \frac{I(E_s^j(x_i), E_s^i(x_i))}{\sum_{k=1}^{K} I(E_s^k(x_i), E_s^i(x_i))}$$

where, $E_s^j(x_i)$ denotes a representation of the current node i extracted by the unique representation extraction model corresponding to any node j among the other nodes; $E_s^i(x_i)$ denotes a representation of the current node i extracted by the unique representation extraction model of the current node i; I denotes calculation of mutual information, and K denotes the number of nodes in the personalized federated learning system;

the global consensus representation aggregation model $E_c^{G_i}$ is obtained by the following equation:

$$E_c^{G_i} = \sum_{j=1}^{K} W_{ji} E_c^j$$

where, $E_c^j$ denotes the local consensus representation extraction model corresponding to any node j among the other nodes.

As an optional embodiment of the present application, the system is further configured for selecting at least two nodes randomly from the plurality of nodes, where the at least two nodes are configured for performing the step S1-step S3.

As an optional embodiment of the present application, the system is further configured for judging whether the times of iteratively executing the step S0-step S3 reaches a preset number of aggregation rounds; if not, returning to continue executing the step S0.

As an optional embodiment of the present application, each node in the system is further configured for updating the local consensus representation extraction model and the unique representation extraction model corresponding to each node according to a first preset optimization condition corresponding to each node; where the first preset optimization condition includes maximizing the value of second mutual information, maximizing the value of the similarity between the local consensus representation extraction model corresponding to each node and the global consensus representation aggregation model obtained from the previous aggregation round, and minimizing the value of third mutual information between the unique representation and the consensus representation of the node's raw data separated in an adversarial manner, where the second mutual information is the sum of the mutual information between the raw data of the nodes and the local consensus representation extraction model corresponding to the nodes and the mutual information between the raw data of the nodes and the global consensus representation aggregation model obtained in the previous aggregation round; updating a node model of each node according to a second preset optimization condition corresponding to each node, where the node model of each node includes a local consensus representation extraction model, a unique representation extraction model and a private prediction model of the node corresponding to each node, and the second preset optimization condition is a loss function value minimized with respect to the local consensus representation extraction model, the unique representation extraction model, and the node private prediction model of the node, where the second preset optimization condition is to minimize the value of the loss function related to the local consensus representation extraction model, the unique representation extraction model and the node private prediction model corresponding to the node.

As an optional embodiment of the present application, each node in the system is further configured for judging whether the number of times of iteratively executing the step S4, the step S5 reaches a preset number of updates; if so, executing the step S1; if not, returning to continue executing the step S4.

As an optional embodiment of the present application, the first preset optimization condition L is shown in the following equation:

$$L=\hat{L}_{MI}{}^i+\lambda_{sim}\hat{L}_{sim}{}^i+\lambda_{client}L_{client}$$

where, $\lambda_{sim}$ denotes similarity weight, $\lambda_{client}$ denotes a third mutual information weight;

$\hat{L}_{MI}{}^i=I_{JSD}(X,E_c{}^i(X))+I_{JSD}(X,E_c{}^G(X))$ denotes the second mutual information;

$$\hat{L}_{sim}^i = \frac{1}{n_i}\sum_{j=1}^{n_i}\cos\left(E_c^i(x_i^j), E_c^G(x_i^j)\right)$$

denotes the similarity obtained by a cosine equation;

$L_{client}=E_{P(E_s^i)P(E_c^i)}[\log\ D(E_s{}^i,E_c{}^i)]+E_{P(E_s^i)P(E_c^i)}[\log(1-D(E_s{}^i,E_c{}^i))]$ denotes the third mutual information, where, $L_{client}$ denotes the third mutual information corresponding to each current node i in the personalized federated learning system; D( ) denotes a similarity calculation function; $P(E_s{}^i)$ denotes a distribution function of the unique representation of each current node i; $P(E_c{}^i)$ denotes the distribution function of the consensus representation for each current node i; $D(E_s{}^i, E_c{}^i)$ denotes the similarity between the unique representations and consensus representations of each current node i; $P(E_s{}^i, E_c{}^i)$ denotes a joint distribution function of the unique representations and consensus representations for each current node i; $E_{P(E_s^i)P(E_c^i)}$ denotes the expectation of calculating two independent distributions $P(E_s{}^i)$ and $P(E_c{}^i)$; $E_{P(E_s^i,E_c^i)}$ denotes the expectation of calculating $P(E_s{}^i, E_c{}^i)$.

The disentangled personalized federated learning system via consensus representation extraction and diversity propagation provided by the embodiments of the present application is similar to the above embodiments in terms of its implementation principles and technical effects, and will not be repeated herein.

Figure 7:
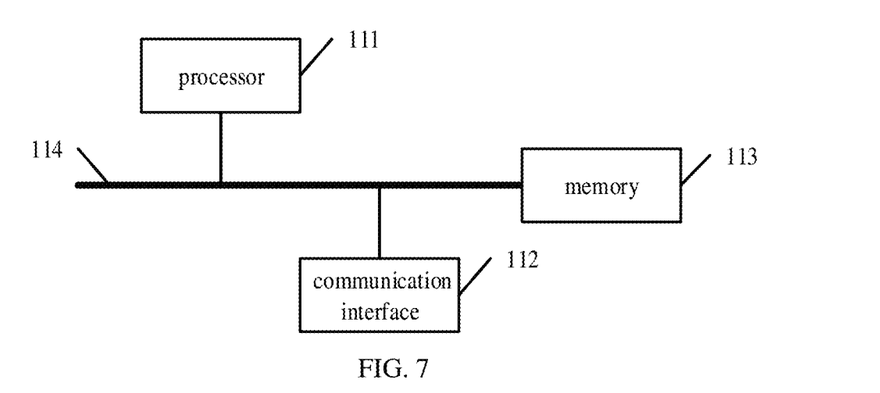
FIG. 7 shows a schematic diagram of the structure of an electronic device provided by an embodiment of the present application.

As shown in FIG. 7, the embodiment of the present application provides an electronic device, including a processor 111, a communication interface 112, a memory 113, and a communication bus 114, where the processor 111, the communication interface 112, and the memory 113 communicate with each other through the communication bus 114.

The memory 113 is configured for storing computer programs.

In one embodiment of the present application, the processor 111 is configured for, when executing the computer programs stored in the memory, implementing steps of the disentangled personalized federated learning method via consensus representation extraction and diversity propagation provided by any of the foregoing method embodiments of the present application.

The memory 113 may be an electronic memory such as a flash memory, an EEPROM (Electrically Erasable Programmable Read Only Memory), an EPROM, a hard disk, or a ROM. The memory 113 has storage space for program code for executing any of the method steps in the above methods. For example, the storage space for program code may include individual program codes for implementing each step in the above method respectively. The program code may be read from or written into one or more computer program products. These computer program products include program code carriers such as hard disks, optical discs (CDs), memory cards, or floppy disks. Such computer program products are typically portable or stationary storage units. The memory unit may have memory segments or memory spaces arranged similarly to the memory 113 in the electronic device described above. The program code may, for example, be compressed in a suitable form. Typically, the storage unit includes programs for executing the method steps according to embodiments of the present disclosure, i.e., code that can be read by a processor, for example, such as 111, which, when run by an electronic device, causes the electronic device to execute the various steps in the method described above.

The embodiment of the invention also provides a non-transitory computer-readable storage medium having computer programs stored thereon. The computer programs, when being executed by a processor, implement steps of the disentangled personalized federated learning method via consensus representation extraction and diversity propagation provided by any of the above-mentioned method embodiments.

The computer readable storage medium may be included in the apparatus/apparatus described in the above embodiments; It can also exist alone and not be assembled into the device/device. The computer readable storage medium carries one or more programs, and when the one or more programs are executed, a method according to an embodiment of the present disclosure is implemented.

It should be noted that, in this context, relational terms such as "first" and "second" are used only to distinguish one entity or operation from another, without necessarily requiring or implying the existence of any such actual relationship or order between these entities or operations. Moreover, the terms "include", "include" or any other variant thereof are intended to cover non-exclusive inclusion, so that a process, method, article or device that includes a set of elements includes not only those elements, but also other elements that are not expressly listed, or that are inherent in such a process, method, article or device. Without further limitation, an element qualified by the phrase "includes a . . . " does not mean that there is another identical element in the process, method, article, or device in which it is included.

The foregoing is only a specific embodiment of the present invention which enables one skilled in the art to understand or implement the present invention. Various modifications to these embodiments will be apparent to those skilled in the art, and the general principles defined herein may be implemented in other embodiments without departing from the spirit or scope of the present invention. Accordingly, the present invention will not be limited to these embodiments shown herein, but will conform to the widest range consistent with the principles and novel features applied herein.

What is claimed is:

1. A disentangled personalized federated learning method via consensus representation extraction and diversity propagation, wherein, the method is applied to a personalized federated learning system, the personalized federated learning system comprises a plurality of nodes, the method comprises following steps:
    step S1, receiving, by a current node, local consensus representation extraction models and unique representation extraction models corresponding to other nodes, respectively;
    step S2, extracting, by the current node, the representations of the data of the current node by using the unique representation extraction models of other nodes respectively, and calculating first mutual information between different sets of representation determining similarity of the data distributions between the nodes based on the size of the first mutual information, and determining aggregation weights corresponding to the other nodes based on the first mutual information;
    step S3, obtaining, by the current node, the global consensus representation aggregation model corresponding to the current node based on aggregation weights corresponding to the other nodes and local consensus representation extraction models corresponding to the other nodes;
    where, the aggregation weight in the step S2 is obtained by the following equation:

$$W_{ji} = \frac{I(E_s^j(x_i), E_s^i(x_i))}{\sum_{k=1}^{K} I(E_s^k(x_i), E_s^i(x_i))}$$

where, $W_{ji}$ denotes the aggregation weight corresponding to any node j among the other nodes; $E_s^j(x_i)$ denotes a representation of current node data $x_i$ of the current node i extracted by the unique representation extraction model $E_s^j$ corresponding to any node j among the other nodes; $E_s^i(x_i)$ denotes a representation of current node data $x_i$ of the current node i extracted by the unique representation extraction model $E_s^i$ of the current node i; I denotes a function for calculation of mutual information, and K denotes the number of nodes in the personalized federated learning system; $E_s^k(x_i)$ denotes the representations of the current node data $x_i$ of the current node i extracted by the unique representation extraction model $E_s^k$ of node k in the personalized federated learning system, where the value of node k is any one of the nodes 1 to K in the personalized federated learning system.

2. The method according to claim 1, wherein,
the global consensus representation aggregation model $E_c^{G_i}$ in the step S3 is obtained by the following equation:

$$E_c^{G_i} = \sum_{j=1}^{K} W_{ji} E_c^j$$

where, $E_c^{G_i}$ denotes the global consensus representation aggregation model corresponding to the current node i, $E_c^j$ denotes the local consensus representation extraction model corresponding to any node j among the other nodes.

3. The method according to claim 1, wherein prior to step S1, the method further comprises:
    step S0, selecting at least two nodes randomly from the plurality of nodes, where the at least two nodes are used to perform the step S1-step S3.

4. The method according to claim 3, wherein the method further comprises:
    judging whether the times of iteratively executing the step S0-step S3 reaches a preset number of aggregation rounds;
    if not, returning to continue executing the step S0.

5. The method according to claim 4, wherein prior to the step S0, the method further comprises:
    step S4, updating the local consensus representation extraction model and the unique representation extraction model corresponding to each node according to a first preset optimization condition corresponding to each node; where the first preset optimization condition comprises maximizing the value of second mutual information, maximizing the value of the similarity between the local consensus representation extraction model corresponding to each node and the global consensus representation aggregation model obtained from the previous aggregation round, and minimizing the value of third mutual information;
    where the second mutual information is the sum of the mutual information between the raw data of the nodes and the representations regarding the raw data of the node in representations extracted by the local consensus representation extraction model corresponding to the nodes and the mutual information between the raw data of the nodes and the representations regarding the raw data of the node in representations extracted by the global consensus representation aggregation model obtained in the previous aggregation round;

the second mutual information satisfies the following expression, $$\hat{L}_{MI}^{i} = I_{JSD}(X, E_c^i(X)) + I_{JSD}(X, E_c^G(X)),$$

where, $\hat{L}_{MI}^{i}$ denotes the second mutual information corresponding to each current node i in the personalized federated learning system, $I_{JSD}(X, E_c^i(X))$ denotes the mutual information between the raw data X of the current node i and the representations $E_c^i(X)$ regarding the raw data X of the node in representations extracted by the local consensus representation extraction model $E_c^i$ corresponding to the current node i; $I_{JSD}(X, E_c^G(X))$ denotes the mutual information between the raw data X of the current node i and the representations $E_c^G(X)$ regarding the raw data X of the node in representations extracted by the global consensus representation aggregation model $E_c^G$ obtained in the previous aggregation round corresponding to the current node i;

the third mutual information is the mutual information between the unique representation and the consensus representation of the node's raw data separated in an adversarial manner;

the third mutual information satisfies the following expression, $$L_{client} = E_{P(E_s^i)P(E_c^i)}[\log D(E_s^i, E_c^i)] + E_{P(E_s^i, E_c^i)}[\log(1-D(E_s^i, E_c^i))],$$

where, $L_{client}$ denotes the third mutual information corresponding to each current node i in the personalized federated learning system; D( ) denotes a similarity calculation function; $P(E_s^i)$ denotes a distribution function of the unique representation of each current node i; $P(E_c^i)$ denotes the distribution function of the consensus representation for each current node i; $D(E_s^i, E_c^i)$ denotes the similarity between the unique representations and consensus representations of each current node i; $P(E_s^i, E_c^i)$ denotes a joint distribution function of the unique representations and consensus representations for each current node i; $E_{P(E_s^i)P(E_c^i)}$ denotes the expectation of calculating two independent distributions $P(E_s^i)$ and $P(E_c^i)$; $E_{P(E_s^i, E_c^i)}$ denotes the expectation of calculating $P(E_s^i, E_c^i)$;

step S5: updating a node model of each node according to a second preset optimization condition corresponding to each node, where the node model of each node comprises a local consensus representation extraction model, a unique representation extraction model and a private prediction model of the node corresponding to each node, and the second preset optimization condition is a loss function value minimized with respect to the local consensus representation extraction model, the unique representation extraction model, and the node private prediction model of the node, where the second preset optimization condition is to minimize the value of the loss function related to the local consensus representation extraction model, the unique representation extraction model and the node private prediction model corresponding to the node.

6. The method according to claim 5, wherein the method further comprises:
   judging whether the number of times of iteratively executing the step S4, the step S5 reaches a preset number of updates;
   if so, executing the step S1; if not, returning to continue executing the step S4.

7. The method according to claim 6, wherein the first preset optimization condition L is shown in the following equation:

$$L = \hat{L}_{MI}^{i} + \lambda_{sim}\hat{L}_{sim}^{i} + \lambda_{client}L_{client}$$

where, $\lambda_{sim}$ denotes similarity weight, $\lambda_{client}$ denotes a third mutual information weight;
$\hat{L}_{MI}^{i}$ denotes the second mutual information;

$$\hat{L}_{sim}^{i} = \frac{1}{n_i}\sum_{j=1}^{n_i}\cos(E_c^i(x_i^j), E_c^G(x_i^j))$$

denotes the similarity obtained by a cosine equation;
$L_{client}$ denotes the third mutual information.

8. An electronic device, comprising a processor, a communication interface, a memory and a communication bus, wherein the processor, the communication interface and the memory communicate with each other through the communication bus;
   the memory is configured for storing computer programs;
   the processor is configured for, when executing the computer programs stored in the memory, implementing steps of the disentangled personalized federated learning method via consensus representation extraction and diversity propagation according to claim 1.

9. A non-transitory computer-readable storage medium having computer programs stored thereon, wherein the computer programs, when being executed by a processor, implement steps of the disentangled personalized federated learning method via consensus representation extraction and diversity propagation according to claim 1.

* * * * *